Figure 1:
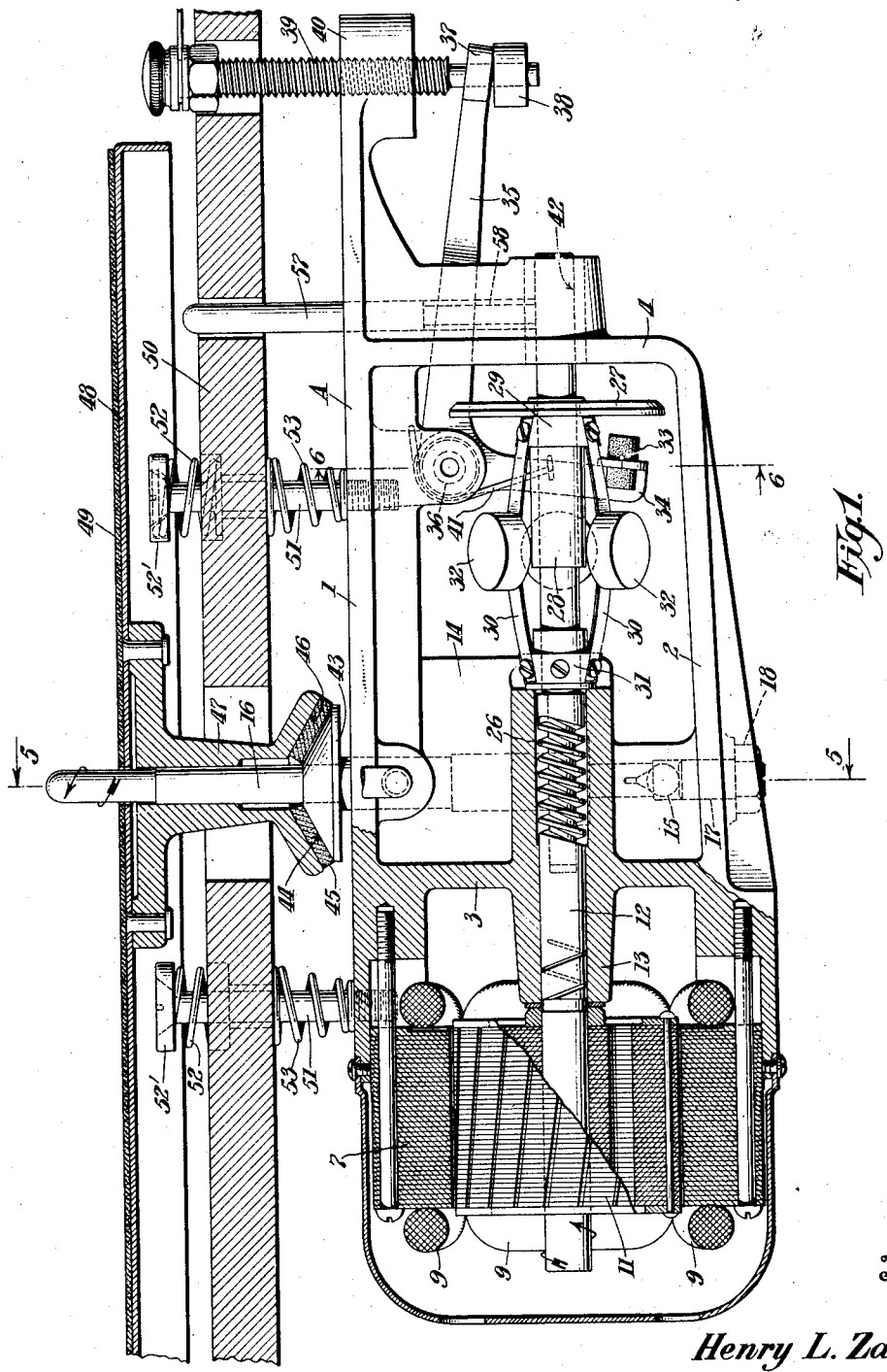

Dec. 22, 1931.   H. L. ZABRISKIE   1,838,047
PHONOGRAPH TURNTABLE MECHANISM
Filed Dec. 22, 1928   3 Sheets-Sheet 1

Inventor
Henry L. Zabriskie

Inventor
Henry L. Zabriskie

Dec. 22, 1931.   H. L. ZABRISKIE   1,838,047
PHONOGRAPH TURNTABLE MECHANISM
Filed Dec. 22, 1928   3 Sheets-Sheet 3
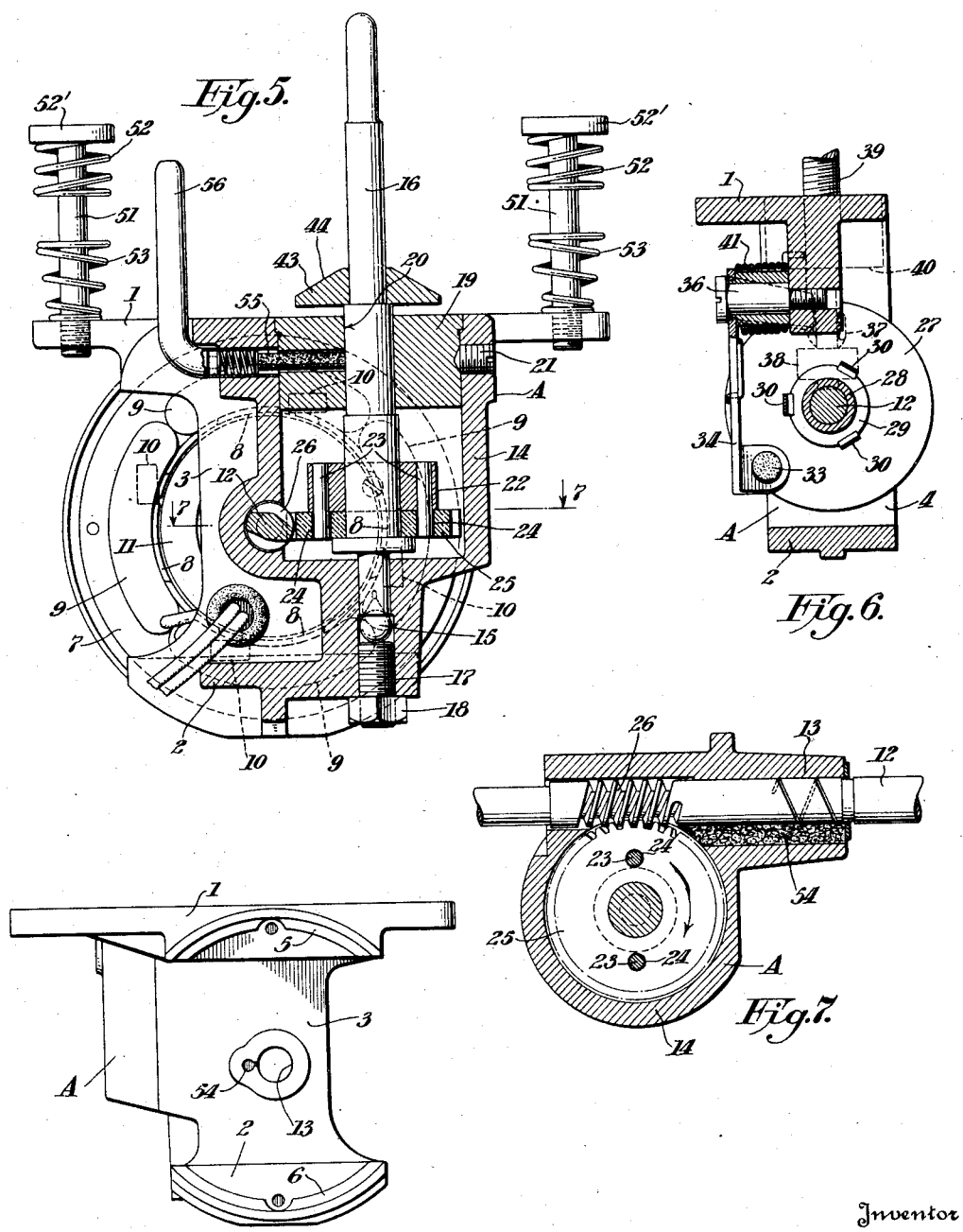

Patented Dec. 22, 1931

1,838,047

UNITED STATES PATENT OFFICE

HENRY L. ZABRISKIE, OF WESTFIELD, NEW JERSEY, ASSIGNOR TO DIEHL MANUFACTURING COMPANY, OF ELIZABETH, NEW JERSEY, A CORPORATION OF NEW JERSEY

PHONOGRAPH TURNTABLE MECHANISM

Application filed December 22, 1928. Serial No. 327,821.

This invention relates to phonographs of the disk-record type and more particularly to the mechanism for supporting and driving the turntable which carries the disk-record. It has for an object to provide an electrically driven turntable mechanism of simple, inexpensive and compact construction which will drive the turntable at a constant though controllable speed and which will not cause radio interference or introduce extraneous electrical or mechanical noises to the pick-up of the sound reproducing system.

To the attainment of the ends in view there is provided a frame-support with cushioning means for mounting it below the usual topboard of a phonograph cabinet or case. Journaled in this frame-support is the turntable-shaft at an angle and to one side of which is journaled an elongated motor-shaft carrying the rotor of an alternating current motor and a centrifugal speed-regulator of the friction-brake type. A single pair of speed-reduction gears connect the two shafts in driving relation. A feature of the invention is the relative arrangement lengthwise of the motor-shaft, of the rotating element of the motor, the shaft bearings, the worm-drive and the speed-regulator; the rotor being disposed at one end of the shaft, the main motor-shaft bearing being next and close to the rotor, the worm-drive being next and close to the main motor bearing; the speed-regulator being next, and a steadying bearing for the motor-shaft being disposed at the extreme end of such shaft remote from the rotor. This relative arrangement of parts makes for a compact and sturdy construction which minimizes vibration and is well adapted for installation as a turntable support and driving device for phonograph records.

It is preferred to employ a shaded pole squirrel-cage induction motor eliminating the need for cut-outs and automatic switches, and also eliminating all interference caused by commutation in motors of the type employing the conventional wound armature with its commutator and brushes.

The gear ratio is so chosen that the turntable shaft may be driven at the standard speed of 78 R. P. M. by a motor-speed sufficiently below synchronous speed to compensate for the slowing up of the motor caused by friction of the working parts including that introduced by the centrifugal speed-governor.

It is also preferred to form the frame-support for the mechanism as a casting with a lubricant housing for the gears and a motor-shaft bearing intersecting such housing and disposed between the rotor of the motor and the centrifugal speed-regulator; the motor-shaft being supported entirely at one end of the motor, the stator of which is received in a seat at one end of the frame-casting.

Figure 2:
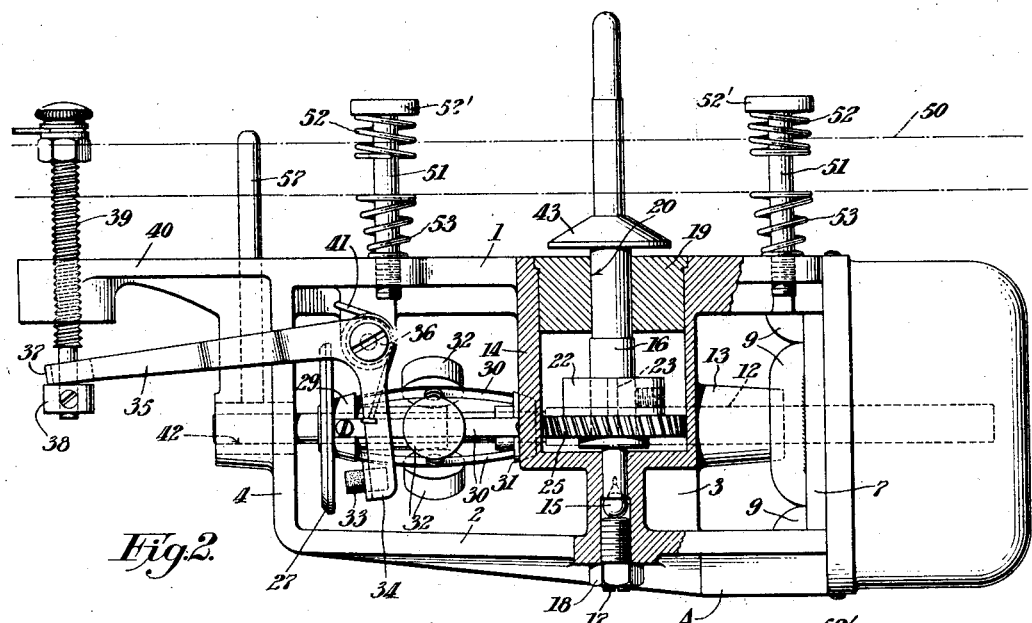
Figure 3:
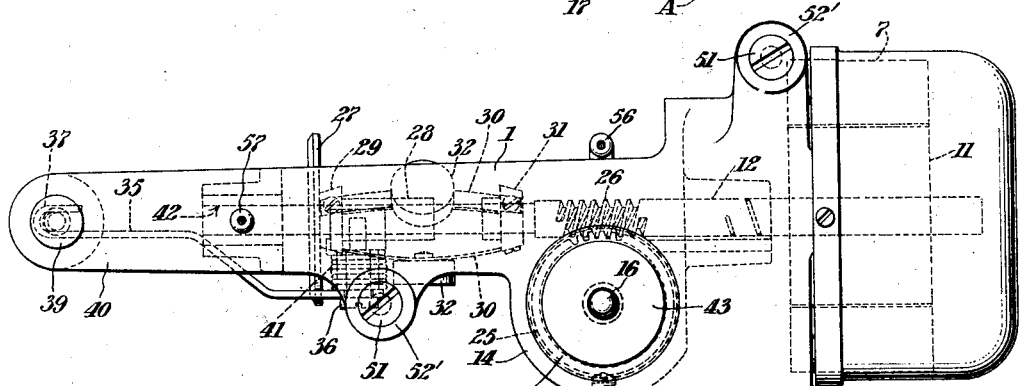
Figure 4:
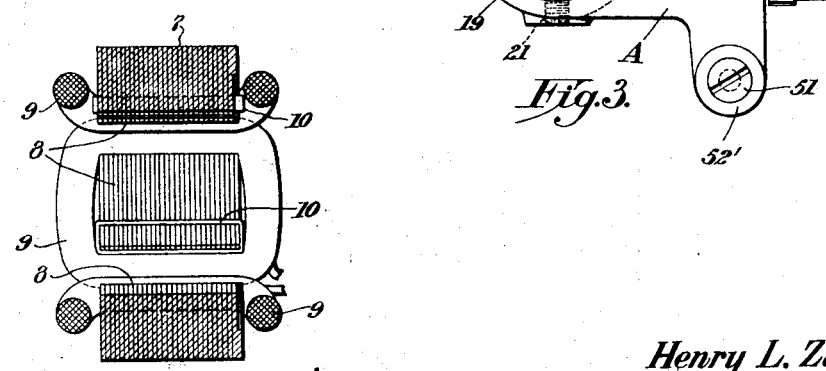

In the accompanying drawings Fig. 1 is a side elevation, partly in section, of a phonograph-record turntable mechanism embodying the invention. Fig. 2 is a reverse side elevation of the mechanism. Fig. 3 is a top plan view of the mechanism. Fig. 4 is a view of one of the pole-faces of the driving motor. Fig. 5 is a section on the line 5—5, Fig. 1. Fig. 6 is a section on the line 6—6, Fig. 1. Fig. 7 is a section on the line 7—7, Fig. 5, and Fig. 8 is a motor-end view of the frame support with the motor removed.

According to the preferred embodiment of the invention illustrated, the device comprises a supporting frame A formed as a casting and including an upper horizontal portion 1 and a lower horizontal portion 2 connected by spaced vertical portions 3 and 4. Secured to the arcuate seats 5, 6 in the frame-portions 1, 2 at one end of the frame is the cylindrical stator-frame 7 of an ordinary induction motor having four poles 8 embraced by the field-coils 9; the poles being shaded to give starting torque by the usual short-circuited copper bands 10 which embrace a portion of each pole face, as shown in Fig. 4. The field-coils 9 are connected in series relation for energization by the usual 60-cycle alternating current supply; the motor thus having a synchronous speed of 1800 R. P. M.

Embraced within the stator-frame 7 is an ordinary squirrel-cage rotor 11 mounted on one end of the motor-shaft 12 which is journaled horizontally in the main bearing 13 formed in the vertical portion 3 of the supporting frame and disposed in juxtaposition to the rotor 11.

Cast integral with the horizontal and vertical portions 1 and 3 of the frame is the gear-housing 14 in the closed bottom of which is mounted the ball step-bearing 15 for the vertically disposed turntable-shaft 16 which is disposed at one side of and in non-intersecting relation with the motor-shaft 12. The bearing ball 15 is supported by the vertical adjusting screw 17 threaded into the bottom of the gear-housing 14 and locked in adjusted position by the nut 18. The main bearing 13 opens into the cavity of the gear-housing 14, as shown in Figs. 5 and 7. The gear-housing 14 is closed at its upper end by the removable plug 19 formed with a bearing 20 for the turntable-shaft 16; the plug 19 being secured in position by the set-screw 21.

Fixed to the shaft 16 within the housing 14 is a disk 22 carrying two diametrically opposed pins 23 which loosely enter the somewhat larger apertures 24 in the gear 25 meshing with the worm 26 cut in the motor-shaft 12 adjacent the main bearing 13; the ratio of gearing being about 18 to 1, requiring a motor-speed of about 1400 R. P. M. for the standard turntable speed of 78 R. P. M. The gear 25 is made of a suitable material having cushioning properties, minimizing the production of gear noise or vibration and the transmission of such noise or vibration to the turntable-shaft 16. Fibrous material, such as canvas, impregnated with a phenolic condensation product or artificial resin, is found to have suitable wear-resisting and cushioning properties. The slight amount of lost motion between the gear 25 and the shaft 16 gives free play for the cushioning properties of the gear.

Slidably mounted on the motor-shaft 12, next to the worm 26, and farther along the shaft 12 from the rotor 11 than the worm 26, is the centrifugally controlled speed-regulating disk 27 having a long tubular hub 28 formed adjacent the disk with a collar 29 to which is secured one end of each of the three bow-springs 30; the other end of each of which springs is secured to the collar 31 fixed to the shaft 12. Riveted to the center of each spring 30 is a weight 32.

When the motor is started and gathers speed, the weights 32 bow the springs 30 outwardly and draw the disk 27 along the shaft 12 into frictional working engagement with the oil-soaked felt brake-shoe 33 carried by the downwardly extending arm 34 of the bell-crank lever 34, 35 fulcrumed at 36 on the frame-member 1; the axis of the fulcrum-screw 36 being transverse to both the motor-shaft 12 and turntable-shaft 16. The other arm 35 of the bell-crank lever extends lengthwise of and beyond the end of the motor-shaft where its return bent end 37 rests upon the collar 38 fixed to the lower end of the speed-regulating screw 39 carried by the extension 40 of the frame-member 1. The spring 41 yieldingly maintains the bell-crank lever-arm 35 in engagement with the collar 38. It will be understood that the working speed of the motor is governed by the position of adjustment of the stationary brake-shoe 33, which produces a drag upon the motor-shaft sufficient to pull the speed of the turntable-shaft down to the desired value.

A speed-regulator of the type described, while quite satisfactory as to its speed-governing characteristics, is difficult to balance so closely that it will not vibrate its supporting shaft. To steady the shaft 12 for the support of the speed-governor, there is provided at the end of such shaft remote from the motor, a bearing 42 which, together with the main bearing, supports the motor-shaft at both ends of the speed-governor and makes for quiet running and smooth operation. It will be observed that the speed governing and adjusting mechanism is carried in its entirety by the supporting frame A.

Fixed to the turntable shaft 16 above the frame-member 1 is a turntable supporting collar 43 having a conical upper face 44 upon which a felt washer 45 is pressed by the mating conical surface 46 at the lower end of the hub 47 of the turntable 48 which supports the phonograph record 49. The felt washer 45 and mating conical faces 44, 46, constitute a friction-clutch having a sufficient grip to drive the record 49 under the usual pick-up needle (not shown). This friction-clutch prevents the gears from being damaged in case the turntable is forcibly turned by hand or held from turning by a careless operator. It also prevents the transmission of motor noise or vibration to the turntable.

The entire device is suspended from the usual top-board 50 of the cabinet or carrying case by means of three screws 51 which are tapped into the frame-member 1. Top cushioning springs 52 are interposed between the board 50 and the screw-head washers 52', and bottom cushioning springs 53 are interposed between the board 50 and the frame-member 1. These cushioning springs absorb any remanent vibration and prevent the transmission of hum or vibration to the supporting cabinet or carrying case.

Lubrication of the gears 25, 26 and the lower bearing for the shaft 16 is taken care of by packing the gear-housing 14 with a suitable grease. A felt-packed duct 54, Fig. 7, along the bearing 13, lubricates the latter from the lubricant supply in the housing 14. The top-bearing 20 for the shaft 16 is lubricated through the wick 55 leading from the oil-tube 56. A similar oil-tube 57 and wick 58 are provided for lubrication of the end-bearing 42.

The shaft-aperture in the bearing 13 is preferably slightly enlarged at 13' where it embraces the worm 26; the enlargement being insufficient to permit escape of the grease used as a gear lubricant. The gears, being totally enclosed, will run for a long time in clean grease, free from grit and dirt.

Having thus set forth the nature of the invention, what I claim herein is:—

1. A phonograph-record turntable mechanism comprising a supporting frame formed with spaced and alined motor-shaft bearings, a motor stator-frame carried by said supporting frame at the end of one of said bearings remote from the other bearing, a rotor embraced by said stator-frame, a motor-shaft carrying said rotor and journaled in said bearings, a centrifugal brake-member mounted on said motor-shaft between said bearings, and a turntable-shaft journaled in said supporting frame and geared to said motor-shaft.

2. A phonograph-record turntable mechanism comprising a supporting frame, a driving motor including a motor-shaft journaled horizontally in said frame, a turntable-shaft journaled vertically in said frame, speed-reduction gearing connecting said shafts, a centrifugally operated brake-disk mounted on and movable lengthwise of the motor-shaft, a bell-crank lever fulcrumed on a horizontal axis disposed above and transverse to the motor-shaft, one arm of the bell-crank lever extending downwardly and the other arm extending in the direction of and beyond the end of the motor-shaft, a brake-shoe carried by the downwardly extending arm of the bell-crank lever in position to be engaged by the brake-disk, and a vertically disposed regulating screw carried by said frame and connected at its lower end to the horizontally extending arm of the bell-crank lever.

3. A phonograph-record turntable mechanism comprising a supporting frame, an electric motor including a stator carried by said frame at one end of the latter, a rotor-shaft, a rotor at one end of the rotor-shaft, a main rotor bearing in said frame next to the rotor, a worm on the rotor-shaft next to said bearing, a centrifugal brake element on the rotor-shaft next to said worm, a second rotor-shaft bearing in said frame next to said centrifugal brake element for steadying the end of said shaft adjacent said centrifugal brake element, a turntable-shaft journaled in said frame transversely and in non-intersecting relation with the motor-shaft, and a gear on the turntable-shaft meshing with said worm.

4. In phonograph apparatus, a skeleton frame having upper and lower portions connected by spaced webs in spaced relation, motor shaft bearings in said spaced webs, complementary motor seats in said upper and lower portions of the frame at one end of the frame structure, an electric motor mounted in said complementary seats at the end of the frame and having a shaft journalled in the bearings in the spaced webs, a governor on said shaft in the space between the webs and a turn-table spindle driven from said motor shaft.

5. In phonograph apparatus, a supporting frame having a horizontally extending substantially circular motor seat at one end and a motor shaft bearing substantially concentric to said seat, an electric motor having a stator engaged in said seat and a cooperating rotor provided with a shaft engaged in the bearing, a gear element carried by said motor shaft and a vertical spindle journalled on the frame and having a gear element in engagement with the gear element on the shaft.

6. In phonograph apparatus, a supporting frame having a horizontally extending substantially circular motor seat at one end and a motor shaft bearing substantially concentric to said seat, an electric motor having a stator engaged in said seat and a cooperating rotor provided with a shaft engaged in the bearing, a gear element carried by said motor shaft, a vertical spindle journalled on the frame and having a gear element in engagement with the gear element on the shaft and horizontally extending screws on the frame and exerting an endwise thrust on the motor stator to removably secure the latter in the end seat aforesaid.

7. In phonograph apparatus, a supporting frame having a horizontally extending motor shaft bearing and a substantially circular motor seat at one end of the frame substantially concentric to said motor shaft bearing, an electric motor applicable endwise to said motor seat and bearing and comprising an annular stator engageable horizontally with the substantially circular motor seat and a cooperating rotor having a shaft extending from one side thereof and engageable endwise in the shaft bearing, screw means for detachably securing the stator to the motor seat, adjustable means for releasably securing the rotor shaft against endwise displacement in the bearing, a spindle journalled for vertical rotation on the supporting frame and drive gearing from the rotor shaft to said vertical spindle.

8. In phonograph apparatus, the combination of a supporting frame, a spindle journalled on said frame and provided with a worm gear and an electric induction motor mounted on said frame and comprising an annular stator detachably mounted on the frame and a cooperating rotor detachably journalled in the frame, said rotor being removable from the frame independently of the stator, means by which said stator is thus detachably secured to the frame, means for detachably journalling the rotor in the frame and for enabling said rotor to be removed from the frame independently of the stator, a vertical spindle journalled on the frame and removable independently of both stator and rotor and drive gearing between the rotor shaft and spindle.

In testimony whereof, I have signed my name to this specification.

HENRY L. ZABRISKIE.